Feb. 17, 1953  J. B. WRIGHT  2,628,531
EYEGLASS HINGE CONSTRUCTION
Filed June 5, 1950
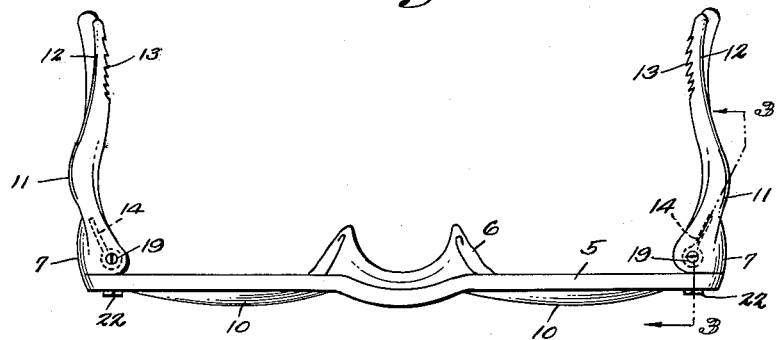
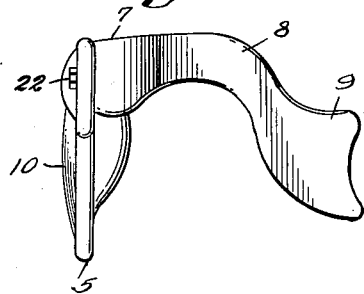
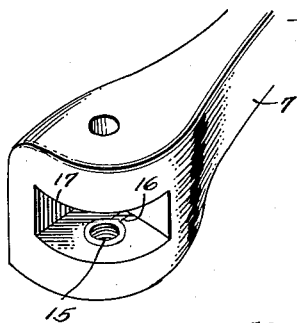
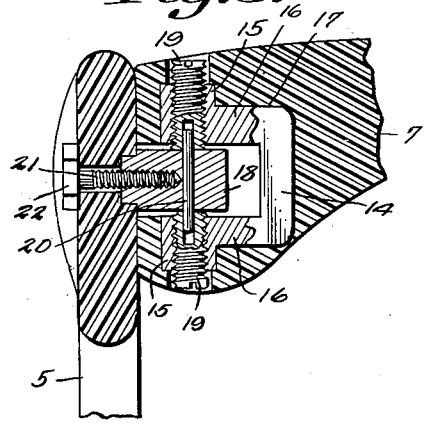
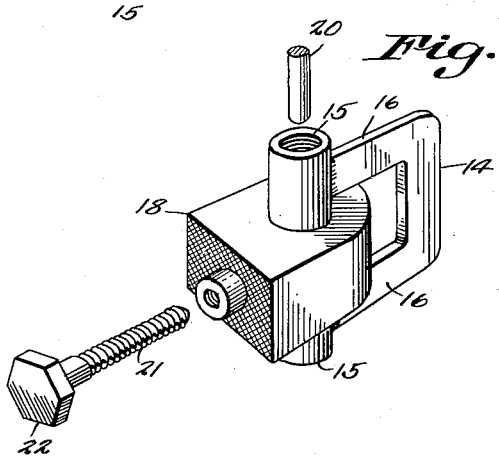
J. B. Wright
INVENTOR
BY C. A. Snow & Co.
ATTORNEYS.

UNITED STATES PATENT OFFICE 2,628,531

EYEGLASS HINGE CONSTRUCTION

James B. Wright, Philadelphia, Pa.

Application June 5, 1950, Serial No. 166,123

2 Claims. (Cl. 88—53)

This invention relates to eyeglass or spectacle construction, and aims to provide an eyeglass wherein exceptionally short temple pieces are provided, the temple pieces being so constructed and arranged that they contact the head of the user of the eyeglasses, at points adjacent to the hair line of the person wearing the eyeglasses near the temples of the person thereby eliminating the objectionable and unsightly ear pieces which form a part of the usual eyeglass temple pieces.

An important object of the invention is to provide a mounting for eyeglass temple pieces which will permit of adjustment of the temple pieces both in a horizontal and vertical plane, with respect to the lenses of the eyeglasses, to the end that the proper adjustment of the temple pieces may be maintained at all times to insure the gripping of the face of the user to maintain the eyeglasses in their correct position over the eyes of the user.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a plan view of eyeglass frames constructed in accordance with the invention, illustrating substantially short temple pieces.

Fig. 2 is a side elevational view thereof.

Fig. 3 is a sectional view taken on line 3—3 of Fig. 1.

Fig. 4 is a perspective view of the pivoted end of one of the temple pieces.

Fig. 5 is an exploded view illustrating the vertical and horizontal temple supporting bearings.

Referring to the drawing in detail, the reference character 5 indicates the main eyeglass frame which may be constructed of any desirable plastic material, the frame including the usual nose piece 6, the construction of which may be readily changed to meet various requirements of use.

The temple pieces indicated by the reference character 7 are substantially short so that they will engage the sides of the human head at points adjacent to the temples of the head and will not extend rearwardly over the ears, as in the conventional type of temple pieces commonly used in eyeglass construction.

As shown, these temple pieces connect with the eyeglass frames, at points above the line of vision at the sides of the eyeglass frames, the temple pieces being provided with upwardly curved portions 8 and downwardly curved portions 9 which are substantially wide, as clearly shown by Fig. 2 of the drawing, and extend to points below a horizontal line drawn centrally through the lenses 10 of the eyeglasses, to properly grip the sides of the head of the user, at points adjacent to the temples of the person. As clearly shown by Fig. 1 of the drawing, these temple pieces 7 are curved outwardly at 11 to fit over the usual enlargements at the sides of the head, where the free ends of the temple pieces curved inwardly at 12, the inner surfaces of the wire portions 9 of the temple pieces being formed with serrations 13 that define teeth or roughened portions disposed forwardly to securely grip the flesh adjacent to the temples of the person wearing the glasses to hold the eyeglasses firmly in position against accidental displacement.

The connection between the temple pieces and frame of the eyeglasses, forms an important feature of the invention, since due to the specific construction of the mounting, the short temple pieces may be properly adjusted to conform to the contour of the face or head with which the eyeglasses are used, to insure the proper gripping of the temple pieces to hold the eyeglasses in position.

Each mounting includes a substantially U-shaped plate 14 formed with threaded bores 15 at the ends of the arms 16 forming a part of the U-shaped plate. This U-shaped plate is embedded in the plastic material of which the eyeglass temple pieces are formed, the material forming the temple pieces being molded around the arms 16 providing a central space 17 in which the pivot block 18 is mounted.

Extending through the threaded bores 15, are threaded bearings 19 in which the ends of the pivot pin 20 extend, the pivot pin extending through an opening formed in the block 18 providing a vertical pivot for the block 18. By rotating the threaded bearings 19, it will be obvious that pressure may be directed to the block 18 to hold the block 18 in various positions of adjustment.

The main eyeglass frame which is indicated by the reference character 5, is formed with openings through which the screws 21 extend, the screws 21 being disposed in threaded bores in the blocks 18, the heads 22 of the screws bearing against the eyeglass frame to securely unite the blocks and eyeglass frame. Due to this construction, it will be obvious that the temple pieces may be adjusted on a horizontal axis to vary the position of the temple pieces with respect to the eyeglass frames, as desired.

Having thus described the invention, what is claimed is:

1. Eyeglasses comprising a frame, pivot blocks, screws extending horizontally through the frame and being threaded in the pivot blocks securing said pivot blocks to the frame, temple pieces having openings, U-shaped plates having threaded openings, disposed within the openings of the temple pieces and embedded in the material of which the temple pieces are formed, bearing members threaded within the threaded openings, pivot pins extending vertically through said pivot blocks, the ends of said pivot pins extending beyond the upper and lower surfaces of the pivot blocks and disposed in the bearing members, pivotally connecting the temple pieces to the frame, and said bearing members engaging the pivot blocks, securing the temple pieces in their positions of adjustment.

2. Eyeglasses comprising a frame, temple pieces adapted to frictionally grip the sides of the face in supporting the eyeglasses on the wearer, adjustable connecting means providing the connection between the temple pieces and the eyeglass frame, comprising U-shaped plates embodying spaced arms having openings embedded within openings formed in the temple pieces, pivot blocks disposed within the U-shaped plates said pivot blocks having openings aligning with the openings of said arms, pivot pin extending through the aligning openings of the pivot blocks and arms of said U-shaped plates for connecting said frame to the blocks, and means for adjusting said blocks with respect to the temple pieces and frame.

JAMES B. WRIGHT.

REFERENCES CITED

The following references are of record in the file of this patent:

UNITED STATES PATENTS

| Number | Name | Date |
| --- | --- | --- |
| 305,944 | Marsh | Sept. 30, 1884 |
| 1,147,773 | Willson et al. | July 27, 1915 |
| 1,517,216 | McDonell | Nov. 25, 1924 |
| 1,788,973 | Becker | Jan. 13, 1931 |

FOREIGN PATENTS

| Number | Country | Date |
| --- | --- | --- |
| 458,990 | Great Britain | Dec. 31, 1936 |